(12) United States Patent
Jung et al.

(10) Patent No.: US 10,372,444 B2
(45) Date of Patent: Aug. 6, 2019

(54) ANDROID DYNAMIC LOADING FILE EXTRACTION METHOD, RECORDING MEDIUM AND SYSTEM FOR PERFORMING THE METHOD

(71) Applicant: Foundation of Soongsil University-Industry Cooperation, Seoul (KR)

(72) Inventors: Souhwan Jung, Seoul (KR); Seongeun Kang, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 49 days.

(21) Appl. No.: 15/835,028

(22) Filed: Dec. 7, 2017

(65) Prior Publication Data

US 2018/0253298 A1 Sep. 6, 2018

(30) Foreign Application Priority Data

Mar. 3, 2017 (KR) .......................... 10-2017-0027824

(51) Int. Cl.
*G06F 9/44* (2018.01)
*G06F 8/74* (2018.01)
(Continued)

(52) U.S. Cl.
CPC .................. *G06F 8/74* (2013.01); *G06F 8/53* (2013.01); *G06F 9/3861* (2013.01);
(Continued)

(58) Field of Classification Search
CPC ....................................................... G06F 8/74
See application file for complete search history.

(56) References Cited

U.S. PATENT DOCUMENTS 8,887,152 B1 * 11/2014 Chen ................... G06F 9/44568
717/174
2015/0229673 A1 * 8/2015 Lee ......................... G06F 21/56
726/1
(Continued)

FOREIGN PATENT DOCUMENTS

KR 10-2009-0051956 A 5/2009
KR 10-2014-0030989 A 3/2014
(Continued)

*Primary Examiner* — Hang Pan
(74) *Attorney, Agent, or Firm* — Novick, Kim & Lee, PLLC; Sang Ho Lee

(57) ABSTRACT

An Android dynamic loading file extraction method includes checking if at least one call of DexClassLoader, BaseDexClassLoader, PathClassLoader and openDexFile is made to a decompile code of Android Application Package (APK), hooking a dynamic loading method created in dynamic loading mechanism when the at least one call is made, extracting a dex path from the dynamic loading method, identifying if a File.delete method is invoked when the dex path is extracted, hooking the File.delete method when the File.delete method is invoked, extracting a path of the File.delete method and identifying if the path of the File.delete method is matched with the dex path, and extracting a dex file or jar file from the decompile code of APK when the path of the File.delete method is unmatched with the dex path. Accordingly, the dex file used in dynamic loading mechanism of the malicious application is extracted, and static analysis of the hidden codes is conducted using reverse engineering mechanism.

14 Claims, 5 Drawing Sheets

(51) Int. Cl.
  *G06F 8/53* (2018.01)
  *G06F 9/38* (2018.01)
  *G06F 11/36* (2006.01)
  *G06F 9/445* (2018.01)
  *G06F 21/00* (2013.01)
  *G06F 21/56* (2013.01)

(52) U.S. Cl.
  CPC ...... *G06F 9/44521* (2013.01); *G06F 11/3624* (2013.01); *G06F 21/00* (2013.01); *G06F 21/562* (2013.01)

(56) References Cited

U.S. PATENT DOCUMENTS

| | | | | |
|---|---|---|---|---|
| 2016/0344771 | A1* | 11/2016 | Xuan | H04L 63/20 |
| 2016/0378447 | A1* | 12/2016 | Nandakumar | G06F 8/53 |
| | | | | 717/108 |
| 2017/0091428 | A1* | 3/2017 | Johnson | G06F 21/10 |
| 2017/0206355 | A1* | 7/2017 | Nagumo | G06F 21/56 |
| 2017/0242664 | A1* | 8/2017 | Chung | G06F 8/315 |

FOREIGN PATENT DOCUMENTS

| | | |
|---|---|---|
| KR | 10-2014-0108445 A | 9/2014 |
| KR | 10-2015-0017925 A | 2/2015 |
| KR | 10-2015-0103903 A | 9/2015 |
| KR | 10-1629929 B1 | 6/2016 |

* cited by examiner

ANDROID DYNAMIC LOADING FILE EXTRACTION METHOD, RECORDING MEDIUM AND SYSTEM FOR PERFORMING THE METHOD

CROSS-REFERENCE TO RELATED APPLICATIONS

This application claims priority under 35 U.S.C. § 119 to Korean Patent Application No. 10-2017-0027824, filed on Mar. 3, 2017, in the Korean Intellectual Property Office, the disclosure of which is incorporated herein by reference in its entirety.

TECHNICAL FIELD

The present disclosure relates to an Android dynamic loading file extraction method, and a recording medium and a system for performing the method, and more particularly, to technology to extract a file containing code of malicious applications hidden with a malicious purpose so that the file can be used in static analysis, to complement Android reverse engineering technique.

BACKGROUND

Java Reflection is a feature in the Java programming language, and is used to examine or modify the runtime behavior of applications running in the Java virtual machine. Java Reflection is a feature that changes the runtime behavior to go against the original code execution direction, making the normal use impossible.

With Java Reflection, it is possible to dynamically acquire class information or load classes at run time. In Java Reflection, classLoader is used to pass a file path with classes as the parameter and create an object, and dynamically invoke classes or methods loaded in classLoader. This technique is called dynamic loading mechanism.

Through this, malicious applications hide code with a malicious purpose. Analysts need to extract a file with the malicious code and perform static analysis.

Android reverse engineering technique is a technique that extracts the code by decompiling Android Application Package (APK). Android Debug Bridge (ADB) can easily extract APK. Besides, apktool can easily unzip APK because APK adopted a Zip format.

When a file is compressed using Apktool, it has classes-.dex, res, lib, assets, META-INF, and resources.arsc. The classes.dex file inside the APK is actually a Dalvik executable file. This classes.dex file is decompiled into dex2jar. Subsequently, the code can be easily extracted using JD-GUI tool.

On the contrary, attackers extract the code through this method, and embed a malicious code to attack. Apktool has functionality to easily repackage the modified code. The repackaged APK file is distributed through a third-party. The APK file is easily vulnerable to reverse engineering attack mechanism, and through this, attack is carried out by embedding dynamic loading code in APK.

Thus, Android reverse engineering technique has the following problems: 1) difficulty in analysis of JavaReflection method used at run time, and 2) difficulty in analysis of the file used in dynamic loading mechanism using ClassLoader. These problems cause difficulty in analysis and results in increased analysis time due to the absence of an accurate call graph in analysis.

SUMMARY

Therefore, the present disclosure is designed to address the issue presented above, and thus an object of the present disclosure is to provide an Android dynamic loading file extraction method.

Another object of the present disclosure is to provide a recording medium having stored therein a computer program for performing the Android dynamic loading file extraction method.

Still yet another object of the present disclosure is to provide a system for performing the Android dynamic loading file extraction method.

An Android dynamic loading file extraction method according to an embodiment for achieving the object of the present disclosure includes checking if at least one call of DexClassLoader, BaseDexClassLoader, PathClassLoader and openDexFile is made to a decompile code of Android Application Package (APK), hooking a dynamic loading method created in dynamic loading mechanism when the at least one call is made, extracting a dex path from the dynamic loading method, identifying if a File.delete method is invoked when the dex path is extracted, hooking the File.delete method when the File.delete method is invoked, extracting a path of the File.delete method and identifying if the path of the File.delete method is matched with the dex path, and extracting a dex file or jar file from the decompile code of APK when the path of the File.delete method is unmatched with the dex path.

In the embodiment of the present disclosure, the Android dynamic loading file extraction method may further include enabling exception handling to prevent the hidden dex file from being deleted, when the path of the File.delete method is matched with the dex path.

In the embodiment of the present disclosure, the enabling of exception handling to prevent the hidden dex file from being deleted may include generating and returning SecurityException.

In the embodiment of the present disclosure, the Android dynamic loading file extraction method may further include extracting a dex file or jar file from the decompile code of APK, when the File.delete method is not invoked.

In the embodiment of the present disclosure, the Android dynamic loading file extraction method may further include conducting code analysis of the extracted dex file or jar file using Android reverse engineering technique.

A non-transitory computer-readable recording medium according to an embodiment for achieving another object of the present disclosure has recorded therein a computer program for performing the Android dynamic loading file extraction method.

An Android dynamic loading file extraction system according to an embodiment for achieving still another object of the present disclosure includes an invocation detection unit configured to check if at least one call of DexClassLoader, BaseDexClassLoader, PathClassLoader and openDexFile is made to a decompile code of Android Application Package (APK), a first hooking unit configured to hook a dynamic loading method created in dynamic loading mechanism when the at least one call is made, a dex path extraction unit configured to extract a dex path from the dynamic loading method, an invocation identifying unit configured to identify if a File.delete method is invoked when the dex path is extracted, a second hooking unit configured to hook the File.delete method when the File.delete method is invoked, a path matching unit configured to extract a path of the File.delete method and identify if the path of the File.delete method is matched with the dex path, and a file extraction unit configured to extract a dex file or jar file from the decompile code of APK when the path of the File.delete method is unmatched with the dex path.

In the embodiment of the present disclosure, the Android dynamic loading file extraction system may further include a security unit configured to enable exception handling by generating SecurityException to prevent the hidden dex file from being deleted when the path of the File.delete method is matched with the dex path.

In the embodiment of the present disclosure, when the invocation identifying unit identifies that the File.delete method is not invoked, the file extraction unit may extract a dex file or jar file from the decompile code of APK.

In the embodiment of the present disclosure, the Android dynamic loading file extraction system may further include a code analysis unit configured to conduct code analysis of the extracted dex file or jar file using Android reverse engineering technique.

According to the Android dynamic loading file extraction method, in order to complement Android reverse engineering technique, missing code caused by dynamic loading mechanism is provided, and perfect repackaging is provided through extraction of missing dex and odex files. This complementing approach can fully recover data for malicious application analysis.

In the past, Android malicious codes were executed with one dex file, but with the sophistication and advancement of malicious codes, recent malicious codes use the dynamic loading mechanism to bypass analysis. Through the method proposed by the present disclosure, analysts can extract a dex file used in dynamic loading mechanism of a malicious application and conduct static analysis of hidden codes using reverse engineering mechanism.

DETAILED DESCRIPTION OF EMBODIMENTS

Figure 1:
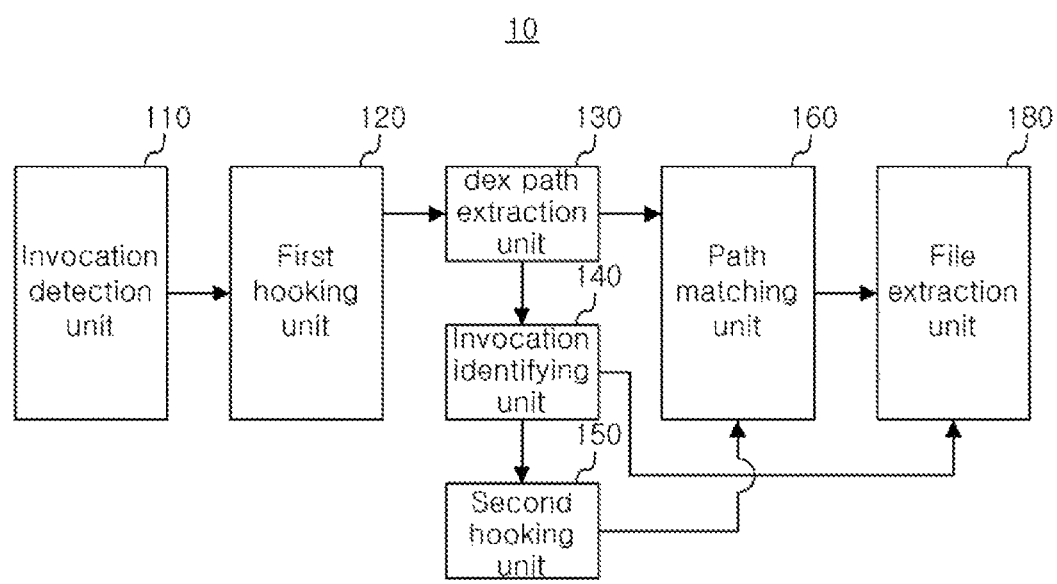
FIG. 1 is a block diagram of an Android dynamic loading file extraction system according to an embodiment of the present disclosure.

The present disclosure is described in detail as below with reference to the accompanying drawings in which particular embodiments for carrying out the present disclosure are shown for illustration. These embodiments are described in sufficient detail to enable those skilled in the art to practice the present disclosure. It should be understood that various embodiments of the present disclosure are different from each other, but they do not need to be exclusive. For example, a particular shape, structure and characteristic described herein, in connection with one embodiment, may be implemented in other embodiments without departing from the spirit and scope of the present disclosure. It should be further understood that modification may be made to the position or arrangement of respective elements in each disclosed embodiment without departing from the spirit and scope of the present disclosure. Therefore, the following detailed description is not intended to make in a limitative sense, and the scope of the present disclosure is only defined by the appended claims, if appropriately described, along with the full scope of equivalents to which the claims are entitled. In the drawings, similar reference numerals denote same or similar functions throughout many aspects.

The term "unit" is defined herein as having its broadest definition to an ordinary skill in the art to refer to a software including instructions executable in a non-transitory computer readable medium that would perform the associated function when executed, a circuit designed to perform the associated function, a hardware designed to perform the associated function, or a combination of a software, a circuit, or a hardware designed to perform the associated function.

Hereinafter, the preferred embodiments of the present disclosure will be described in more detail with reference to the accompanying drawings.

FIG. 1 is a block diagram of an Android dynamic loading file extraction system according to an embodiment of the present disclosure.

Recently, Android malicious applications are becoming more sophisticated to bypass existing static analysis. A malicious application uses dynamic loading mechanism to hide malicious code.

In case that a malicious application uses dynamic loading mechanism, a DEX file or jar file is deleted immediately after it is encrypted or downloaded from a C&C server, and thus it is very difficult to analyze the malicious application using static analysis without extraction of the file used in dynamic loading.

The Android dynamic loading file extraction system 10 (hereinafter system) according to the present disclosure extracts a DEX file and a jar file used in a malicious application, monitors dynamic loading through hooking, and extracts the file used in dynamic loading of the malicious application.

Referring to FIG. 1, the system 10 according to the present disclosure includes an invocation detection unit 110, a first hooking unit 120, a dex path extraction unit 130, an invocation identifying unit 140, a second hooking unit 150, path matching unit 160, and a file extraction unit 180.

The system 10 of the present disclosure is where software (application) for performing Android dynamic loading file extraction may be installed and executed, and the invocation detection unit 110, the first hooking unit 120, the dex path extraction unit 130, the invocation identifying unit 140, the second hooking unit 150, the path matching unit 160 and the file extraction unit 180 may be controlled by the software for performing Android dynamic loading file extraction running on the system 10.

The system 10 may be a separate terminal or a constituent module of the terminal. Furthermore, the invocation detection unit 110, the first hooking unit 120, the dex path extraction unit 130, the invocation identifying unit 140, the second hooking unit 150, the path matching unit 160 and the file extraction unit 180 may be formed as an integrated module or may be composed of at least one module. On the contrary, however, each element may be formed as a separate module.

The system 10 may have mobility or be stationary. The system 10 may be in the form of a server or an engine, and may be also called a device, an apparatus, a terminal, a user equipment (UE), a mobile station (MS), a wireless device, and a handheld device.

The system 10 may execute or create various software based on an operation system (OS), i.e., a system. The operating system is a system program that allows the software to use the device hardware, and in the present disclosure, may be based on an Android OS.

The invocation detection unit 110 checks if a call associated with a dex file is made to a decompile code of Android Application Package (APK). For example, the call associated with a dex file may be DexClassLoader, BaseDexClassLoader, PathClassLoader, and openDexFile.

APK can be easily extracted through Android Debug Bridge (ADB), and because APK adopted a Zip format, APK can be easily unzipped using apktool. If it is compressed using Apktool, it has classes.dex, res, lib, assets, META-INF, and resources.arsc. The classes.dex file inside APK is actually a Dalvik executable file. This classes.dex file is decompiled into dex2jar. Subsequently, using JD-GUI tool, code can be easily extracted.

When at least one call of DexClassLoader, BaseDexClassLoader, PathClassLoader and openDexFile is made, the first hooking unit 120 hooks a dynamic loading method created in dynamic loading mechanism.

Hooking refers to commands, methods and techniques used to alter or intercept function calls, messages and events passed between software components in various computer programs of an operating system or application software. In this instance, code that handles such intercepted function calls, events or messages is called a hook. For example, when a particular API is hooked, an operation such as manipulation of a return value of the corresponding API can be performed.

When hooking is completed by the first hooking unit 120, the dex path extraction unit 130 extracts a dex path from the dynamic loading method.

When the dex path is extracted by the dex path extraction unit 130, the invocation identifying unit 140 identifies if a File.delete method is invoked. When the File.delete method is not invoked, the invocation identifying unit 140 provides notification to the file extraction unit 180, and the file extraction unit 180 extracts a dex file or jar file from the decompile code of APK.

When the invocation identifying unit 140 identifies that the File.delete method is invoked, the second hooking unit 150 hooks the File.delete method.

The path matching unit 160 extracts a path of the File.delete method hooked by the second hooking unit 150, and identifies if the path of the File.delete method is matched with the dex path extracted by the dex path extraction unit 130.

As a result of path matching by the path matching unit 160, when the path of the File.delete method is unmatched with the dex path, the file extraction unit 180 extracts a dex file or jar file from the decompile code of APK.

The dex file extracted by the file extraction unit 180 may conduct code analysis using Android reverse engineering technique. The code analysis may be static analysis.

According to the present disclosure, it is possible to fully recover data for analysis of the malicious application by providing missing code caused by dynamic loading mechanism and providing perfect repackaging through extraction of missing dex file and odex file.

Figure 2:
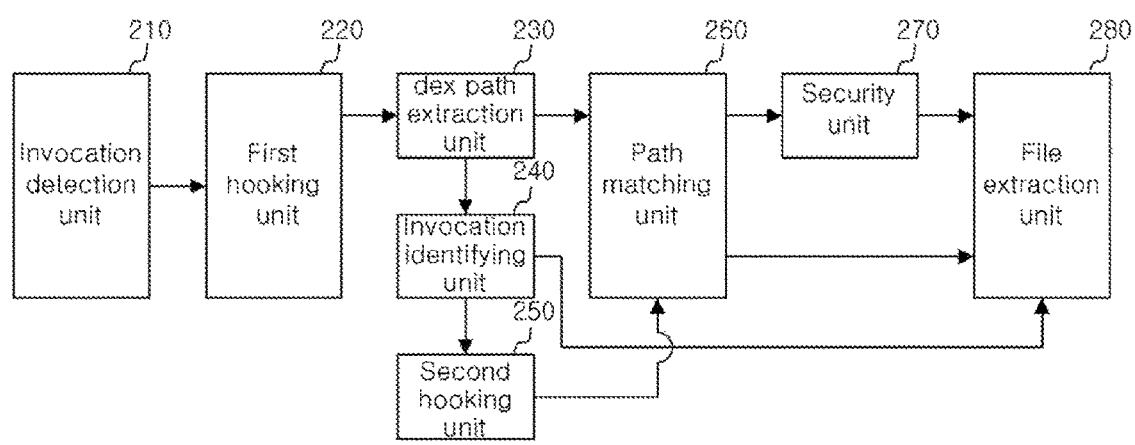
FIG. 2 is a block diagram of an Android dynamic loading file extraction system according to another embodiment of the present disclosure.

FIG. 2 is a block diagram of an Android dynamic loading file extraction system according to another embodiment of the present disclosure.

Referring to FIG. 2, the Android dynamic loading file extraction system 20 (hereinafter system) according to another embodiment of the present disclosure further includes a security unit 270. The system 20 according to this embodiment may run in substantially the same configuration as the system 10 of FIG. 1, except further including the security unit 270.

Accordingly, a repeated description of the same elements as the system 10 of FIG. 1, i.e., an invocation detection unit 210, a first hooking unit 220, a dex path extraction unit 230, an invocation identifying unit 240, a second hooking unit 250, a path matching unit 260 and a file extraction unit 280, is omitted herein.

As a result of path matching by the path matching unit 260, when the path of the File.delete method is matched with the dex path, the security unit 270 enable exception handling to prevent the hidden dex file from being deleted. For example, the security unit 270 may generate and return SecurityException.

After the security unit 270 enables exception handling, the file extraction unit 280 extracts a dex file or jar file from the decompile code of APK.

Figure 3:
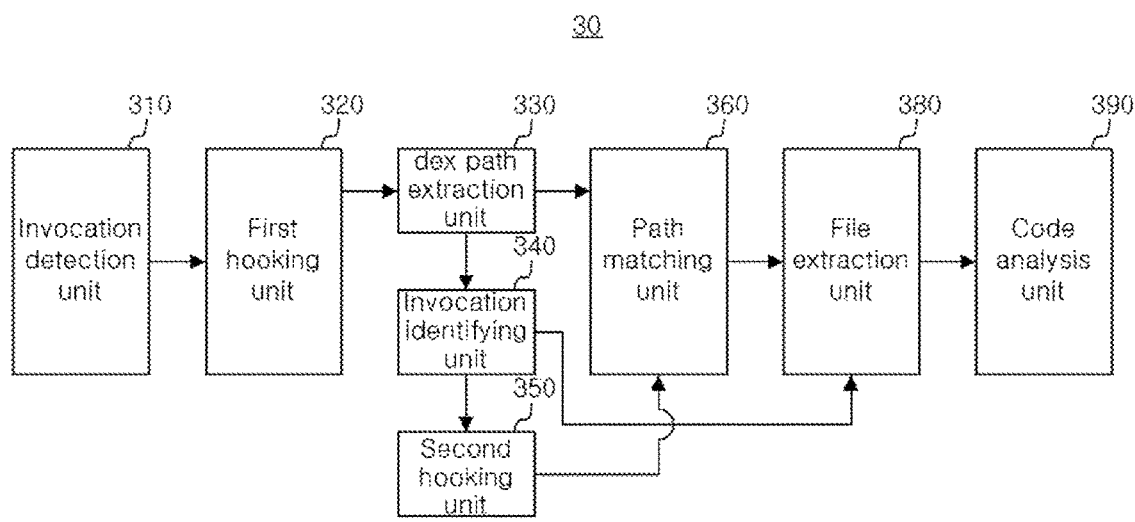
FIG. 3 is a block diagram of an Android dynamic loading file extraction system according to still another embodiment of the present disclosure.

FIG. 3 is a block diagram of an Android dynamic loading file extraction system according to still another embodiment of the present disclosure.

Referring to FIG. 3, the Android dynamic loading file extraction system 30 (hereinafter system) according to still another embodiment of the present disclosure further includes a code analysis unit 390. The system 30 according to this embodiment may run in substantially the same configuration as the system 10 of FIG. 1, except further including the code analysis unit 390.

Accordingly, a repeated description of the same elements as the system 10 of FIG. 1, i.e., an invocation detection unit 310, a first hooking unit 320, a dex path extraction unit 330, an invocation identifying unit 340, a second hooking unit 350, a path matching unit 360 and a file extraction unit 380, is omitted herein.

The code analysis unit 390 conducts code analysis of the dex file or jar file extracted by the file extraction unit 380 using Android reverse engineering technique. In other words, the dex file used in dynamic loading mechanism of the malicious application is extracted, and static analysis of the hidden codes is conducted using reverse engineering mechanism.

Figure 4:
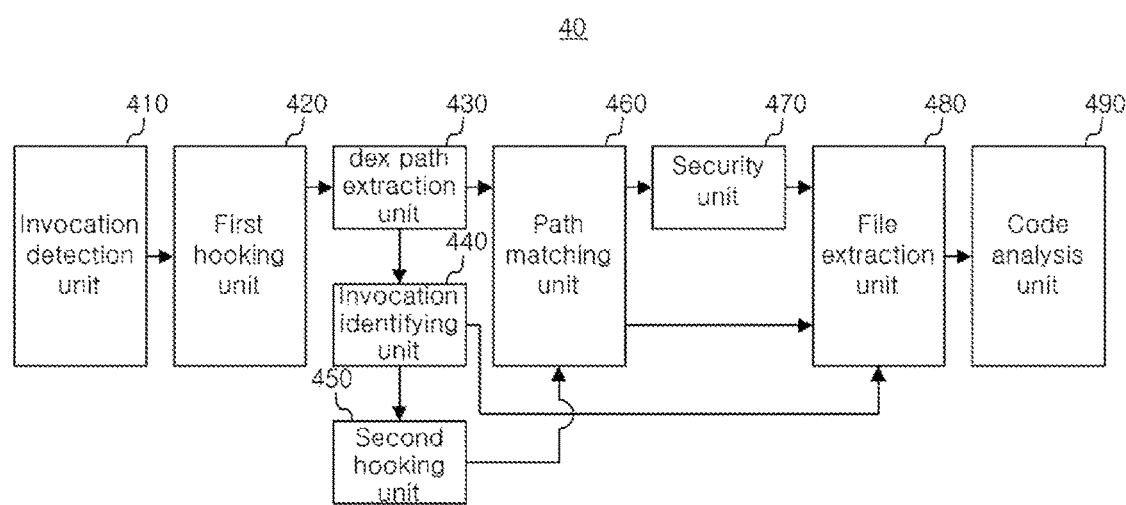
FIG. 4 is a block diagram of an Android dynamic loading file extraction system according to yet another embodiment of the present disclosure.

FIG. 4 is a block diagram of an Android dynamic loading file extraction system according to yet another embodiment of the present disclosure.

Referring to FIG. 4, the system 40 according to the present disclosure includes an invocation detection unit 410, a first hooking unit 420, a dex path extraction unit 430, an invocation identifying unit 440, a second hooking unit 450, a path matching unit 460, a security unit 470, a file extraction unit 480, and a code analysis unit 490.

The invocation detection unit 410 checks if a call associated with a dex file is made to a decompile code of Android Application Package (APK). For example, the call associated with a dex file may be DexClassLoader, BaseDexClassLoader, PathClassLoader and openDexFile.

When at least one call of DexClassLoader, BaseDexClassLoader, PathClassLoader and openDexFile is made, the first hooking unit 420 hooks a dynamic loading method created in dynamic loading mechanism.

When hooking is completed by the first hooking unit 420, the dex path extraction unit 430 extracts a dex path from the dynamic loading method.

When the dex path is extracted by the dex path extraction unit 430, the invocation identifying unit 440 identifies if a File.delete method is invoked. When the File.delete method is not invoked, the invocation identifying unit 440 provides notification to the file extraction unit 480, and the file extraction unit 480 extracts a dex file or jar file from the decompile code of APK.

When the invocation identifying unit 440 identifies that the File.delete method is invoked, the second hooking unit 450 hooks the File.delete method.

The path matching unit 460 extracts a path of the File.delete method hooked by the second hooking unit 450, and identifies if the path of the File.delete method is matched with the dex path extracted by the dex path extraction unit 430.

As a result of path matching by the path matching unit 460, when the path of the File.delete method is matched with the dex path, the security unit 470 enables exception handling to prevent the hidden dex file from being deleted. For example, the security unit 470 may generate and return SecurityException.

After the security unit 470 enables exception handling, the file extraction unit 280 extracts a dex file or jar file from the decompile code of APK.

As a result of path matching by the path matching unit 460, when the path of the File.delete method is unmatched with the dex path, the file extraction unit 480 extracts a dex file or jar file from the decompile code of APK.

The code analysis unit 490 conducts code analysis of the dex file or jar file extracted by the file extraction unit 480 using Android reverse engineering technique. In other words, the dex file used in dynamic loading mechanism of the malicious application is extracted, and static analysis of the hidden codes is conducted using reverse engineering mechanism.

According to the present disclosure, it is possible to fully recover data for analysis of the malicious application by providing missing code caused by dynamic loading mechanism and providing perfect repackaging through extraction of missing dex file and odex file.

Figure 5:
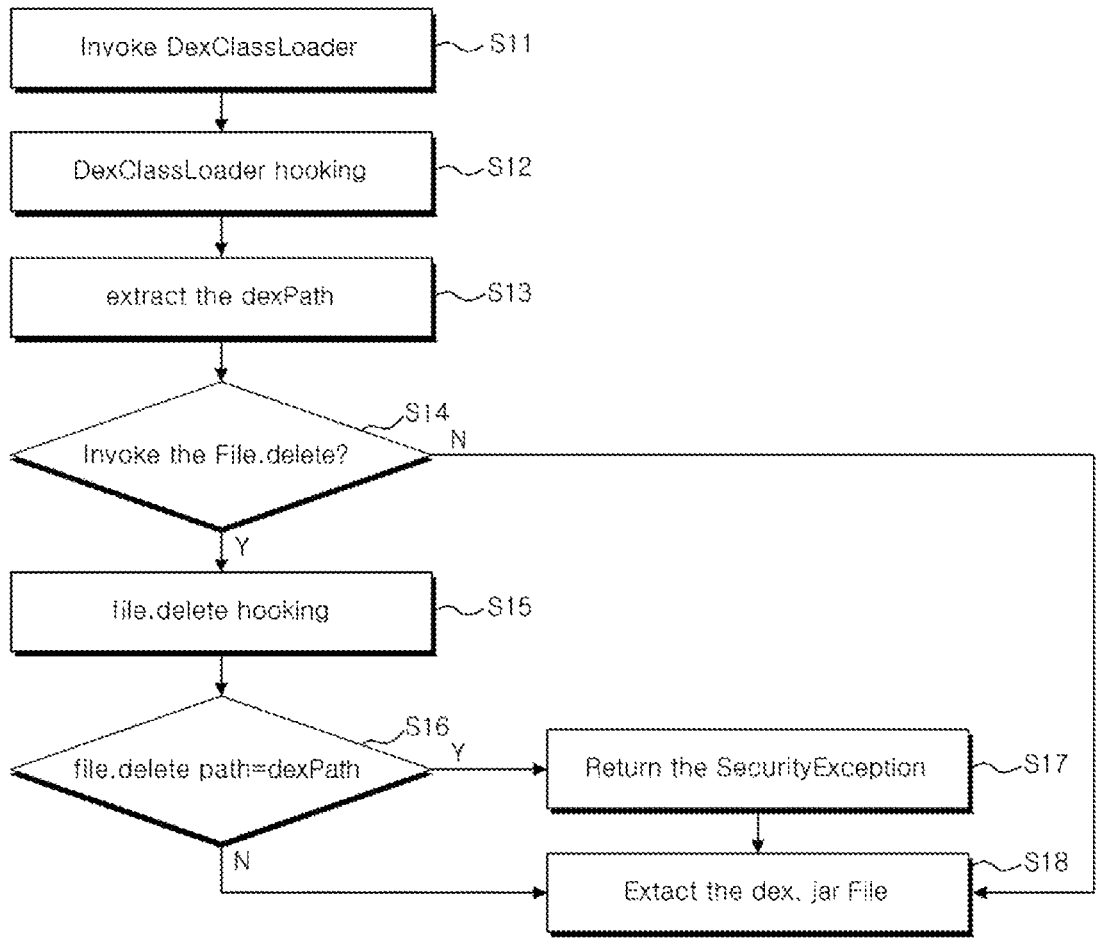
FIG. 5 is a flowchart of an Android dynamic loading file extraction method according to an embodiment of the present disclosure.

FIG. 5 is a flowchart of an Android dynamic loading file extraction method according to an embodiment of the present disclosure.

The Android dynamic loading file extraction method according to this embodiment may be performed in the same configuration as the system 40 of FIG. 4. Accordingly, the same elements as the system 40 of FIG. 4 are indicated by the same reference numerals, and a repeated description is omitted herein.

Furthermore, the Android dynamic loading file extraction method according to this embodiment may be performed by software (application) for performing Android dynamic loading file extraction.

The Android dynamic loading file extraction method according to this embodiment suggests a method for extracting a dex file and jar file used in a malicious application, and proposes a method for extracting a file used in dynamic loading of a malicious application after monitoring dynamic loading through hooking.

Referring to FIG. 5, the Android dynamic loading file extraction method according to this embodiment starts with checking if at least one call of DexClassLoader, BaseDexClassLoader, PathClassLoader and openDexFile is made to a decompile code of Android Application Package (APK) As a non-limiting example, a call of DexClassLoader is made in S11 (S11).

When at least one call of DexClassLoader, BaseDexClassLoader, PathClassLoader and openDexFile is made, a dynamic loading method created in dynamic loading mechanism is hooked (S12), and when the hooking of the dynamic loading method is completed, a dex path is extracted from the dynamic loading method (S13).

When the dex path is extracted, it is identified if a File.delete method is invoked (S14). When the File.delete method is not invoked, a dex file or jar file is extracted from the decompile code of APK (S18).

When the File.delete method is invoked, the File.delete method is hooked (S15), and a path of the File.delete method is extracted and it is identified if the path of the File.delete method is matched with the dex path (S16).

As a result of path matching, when the path of the File.delete method is unmatched with the dex path, a dex file or jar file is extracted from the decompile code of APK (S18).

On the contrary, when the path of the File.delete method is matched with the dex path, exception handling is enabled to prevent the hidden dex file from being deleted (S17). For example, SecurityException may be generated and returned.

Furthermore, code analysis of the extracted dex file or jar file may be conducted using Android reverse engineering technique. In other words, the dex file used in dynamic loading mechanism of the malicious application is extracted, and static analysis of the hidden codes is conducted using reverse engineering mechanism.

According to the present disclosure, it is possible to fully recover data for analysis of the malicious application by providing missing code caused by dynamic loading mechanism and providing perfect repackaging through extraction of missing dex file and odex file.

The Android dynamic loading file extraction method described above may be implemented as applications or in the form of program commands that are executed through various computer components and may be recorded in computer-readable recording media. The computer-readable recording media may include program commands, data files and data structures, alone or in combination.

The program commands recorded in the computer-readable recording media may be specially designed and configured for the present disclosure, and may be known and available to those having ordinary skill in the field of computer software.

Examples of the computer-readable recording media include hardware devices specially designed to store and execute program commands, such as magnetic media such as hard disk, floppy disk and magnetic tape, optical media such as CD-ROM and DVD, magneto-optical media such as floptical disk, and ROM, RAM and flash memory.

Examples of the program command include machine code generated by a compiler as well as high-level language code that can be executed by a computer using an interpreter. The hardware device may be configured to act as one or more software modules to perform the operation according to the present disclosure, or vice versa.

While the present disclosure has been hereinabove described with reference to the embodiments, it will be appreciated by those having ordinary skill in the art that various changes and modifications may be made thereto without departing from the spirit and scope of the present disclosure defined in the appended claims.

The present disclosure can fully recover data for malicious application analysis by solving the problem of existing Android reverse engineering technique, such as difficulty in analysis of JavaReflection method used at run time and difficulty in analysis of the file used in dynamic loading mechanism using ClassLoader. Accordingly, it is expected to extract a file containing code of malicious applications hidden with a malicious purpose so that the file can be usefully applied to static analysis.

DETAILED DESCRIPTION OF MAIN ELEMENTS 10, 20, 30, 40: Android dynamic loading file extraction system
110, 210, 310, 410: Invocation detection unit
120, 220, 320, 420: First hooking unit
130, 230, 330, 430: dex path extraction unit
140, 240, 340, 440: Invocation identifying unit
150, 250, 350, 450: Second hooking unit
160, 260, 360, 460: Path matching unit
270, 470: Security unit
180, 280, 380, 480: File extraction unit
390, 490: Code analysis unit

What is claimed is:

1. An Android dynamic loading file extraction method using a memory and a processor, the method comprising:
checking if at least one call of DexClassLoader, BaseDexClassLoader, PathClassLoader and openDexFile is made to a decompile code of Android Application Package (APK);
hooking a dynamic loading method created in dynamic loading mechanism, when the at least one call is made;
extracting a dex path from the dynamic loading method;
identifying if a File.delete method is invoked, when the dex path is extracted;
hooking the File.delete method, when the File.delete method is invoked;
extracting a path of the File.delete method and identifying whether the path of the File.delete method is matched with the dex path; and
extracting a dex file or a jar file from the decompile code of the APK, if the path of the File.delete method is not matched with the dex path.

2. The Android dynamic loading file extraction method of claim 1, further comprising:
if the path of the File.delete method is matched with the dex path, enabling an exception handling to prevent a hidden dex file from being deleted.

3. The Android dynamic loading file extraction method of claim 2, wherein the enabling of the exception handling to prevent the hidden dex file from being deleted comprises generating and returning SecurityException.

4. The Android dynamic loading file extraction method of claim 1, further comprising:
if the File.delete method is not invoked, extracting the dex file or the jar file from the decompile code of the APK.

5. The Android dynamic loading file extraction method of claim 1, further comprising:
conducting code analysis of the extracted dex file or the extracted dex jar file using Android reverse engineering technique.

6. A non-transitory computer-readable recording medium having recorded therein a computer program for performing the Android dynamic loading file extraction method, the method comprising:
checking if at least one call of DexClassLoader, BaseDexClassLoader, PathClassLoader and openDexFile is made to a decompile code of Android Application Package (APK);
hooking a dynamic loading method created in dynamic loading mechanism, when the at least one call is made;
extracting a dex path from the dynamic loading method;
identifying if a File.delete method is invoked, when the dex path is extracted;
hooking the File.delete method, when the File.delete method is invoked;
extracting a path of the File.delete method and identifying whether the path of the File.delete method is matched with the dex path; and
extracting a dex file or a jar file from the decompile code of the APK, if the path of the File.delete method is not matched with the dex path.

7. The non-transitory computer-readable recording medium of claim 6, further comprising:
if the path of the File.delete method is matched with the dex path, enabling an exception handling to prevent a hidden dex file from being deleted.

8. The non-transitory computer-readable recording medium of claim 7, wherein the enabling of the exception handling to prevent the hidden dex file from being deleted comprises generating and returning SecurityException.

9. The non-transitory computer-readable recording medium of claim 6, further comprising:
if the File.delete method is not invoked, extracting the dex file or the jar file from the decompile code of the APK.

10. The non-transitory computer-readable recording medium of claim 6, further comprising:
conducting code analysis of the extracted dex file or the extracted dex jar file using Android reverse engineering technique.

11. An Android dynamic loading file extraction system using a memory and a processor, the system comprising:
an invocation detector processor to check if at least one call of DexClassLoader, BaseDexClassLoader, PathClassLoader and openDexFile is made to a decompile code of Android Application Package (APK);
a first hooking processor to hook a dynamic loading method created in dynamic loading mechanism, when the at least one call is made;
a dex path extractor processor to extract a dex path from the dynamic loading method;
an invocation identifier processor to identify if a File.delete method is invoked, when the dex path is extracted;
a second hooking processor to hook the File.delete method, when the File.delete method is invoked;
a path matcher processor to extract a path of the File.delete method and identify whether the path of the File.delete method is matched with the dex path; and
a file extractor processor to extract a dex file or a jar file from the decompile code of the APK, if the path of the File.delete method is not matched with the dex path.

12. The Android dynamic loading file extraction system according to claim 11, further comprising:
a security processor to enable an exception handling and generate a SecurityException to prevent a hidden dex file from being deleted, if the path of the File.delete method is matched with the dex path.

13. The Android dynamic loading file extraction system of claim 11, wherein when the invocation identifier processor identifies that the File.delete method is not invoked, the file extractor processor extracts a dex file or jar file from the decompile code of APK.

14. The Android dynamic loading file extraction system of claim 11, further comprising:

a code analysis processor to conduct code analysis of the extracted dex file or jar file using an Android reverse engineering technique.

\* \* \* \* \*